(12) United States Patent
Miller et al.

(10) Patent No.: US 7,255,827 B2
(45) Date of Patent: Aug. 14, 2007

(54) BLOW CYLINDER WITH FLUID CUSHION

(75) Inventors: Marshall Miller, Oil City, PA (US);
Bernie Klingenmaier, York, PA (US)

(73) Assignee: Graham Packaging Company, L.P., York, PA (US)

( * ) Notice: Subject to any disclaimer, the term of this patent is extended or adjusted under 35 U.S.C. 154(b) by 787 days.

(21) Appl. No.: 10/733,647

(22) Filed: Dec. 12, 2003

(65) Prior Publication Data
US 2005/0127025 A1    Jun. 16, 2005

(51) Int. Cl.
*B29C 49/60* (2006.01)
(52) U.S. Cl. .................. 264/523; 425/535; 425/536
(58) Field of Classification Search ............... 264/523; 425/535, 536
See application file for complete search history.

(56) References Cited
U.S. PATENT DOCUMENTS
3,751,207 A * 8/1973 Mehnert ..................... 425/532
3,895,897 A * 7/1975 Hudson ..................... 425/182

OTHER PUBLICATIONS

Products & Specification Charts/ Single & Double Acting Cylinders, Bearing Options, http://www.illpneumatics.com/index.html (Illinois Pneumatics, Inc; accessed Jun. 18, 2004).
1A/H Series Light Duty Air/Hydraulic, http://www.ortmanfluidpower.com/Products/1a_h.htm (Ortman Fluid Power, an EnPro Industries, Inc. company; accessed Jun. 18, 2004).

* cited by examiner

*Primary Examiner*—Suzanne E. McDowell

(57) ABSTRACT

Novel blow cylinders use a retract fluid at a minimum pressure, located between a piston head and a wall of a cylinder body, to prevent the piston head from violently impacting the wall when the piston head is moved so that a blow needle engages a parison. The retract fluid at a minimum pressure is also used to move the piston head so that the blow needle disengages the parison.

30 Claims, 2 Drawing Sheets

BLOW CYLINDER WITH FLUID CUSHION

BACKGROUND OF THE INVENTION

1. Field of the Invention

The present invention relates to a blow cylinder, which can be used as a component of a blow molding system. More particularly, the invention is a blow cylinder that utilizes a fluid at a minimum pressure to cushion a piston head as the blow cylinder acts to extend a blow needle.

2. Description of the Related Art

A piston assembly in a blow cylinder used to extend a blow needle into a parison typically includes a piston head, a piston rod, and a blow needle. In order to extend the blow needle, air is forced into the head space of the blow cylinder adjacent to the side of the piston head farthest from the blow needle. The air pressure forces the piston head to extend, along with the piston rod and the blow needle, such that the blow needle engages and pierces the parison. A parison is a hollow plastic tube, for example, in the shape of a test tube. After the parison has been pierced, a fluid, e.g., air, can be forced through the blow needle and into the hollow interior of the parison to inflate the parison against the walls of a mold. The features of the mold in conjunction with the inflation pressure mold the container. After inflation, the blow cylinder can retract the blow needle from the molded container.

In a conventional blow cylinder, when the piston head is forced in a direction, the piston head can violently impact a wall that limits the travel of the piston head in the cylinder body. In order to retract the blow needle after inflation, air is forced into the heel space adjacent to the side of the piston head closest to the blow needle. The air pressure forces the piston head to move such that the blow needle disengages the blow molded container. In this step, the side of the piston head farthest from the blow needle can violently impact an end cap of the blow cylinder. The repeated impact of the piston head alternately against a cavity wall and an end cap in the blow cylinder causes wear and metal fatigue in the piston head and in the piston rod, which connects the piston head and the blow needle, resulting in failure of the blow cylinder. The blow cylinder must then be replaced or repaired, generally long before surfaces and components other than the piston head and the piston rod have worn out. The potential for failure of a conventional blow cylinder detrimentally affects the reliability of the entire blow molding system, and the need for frequent blow cylinder replacement or repair increases the cost of operation of the system as a whole.

In order to support the operation of a conventional blow cylinder, the blow molding system must include not only a valve regulating the flow of air to the head space of each blow cylinder for extending the blow needle, but also a second valve regulating the flow of air to the heel space of each blow cylinder for retracting the blow needle. Each of these valves requires its own set of cams or solenoids to control operation of the valve. Even if the two valves can be replaced with a single three-way valve, a three-way valve is more expensive than a valve with only on and off positions.

In general, pneumatic cylinders in which air pressure is used to force the piston head in an extend direction and air pressure is used to force the piston head in a retract direction are referred to as double-acting cylinders. For example, double-acting cylinders are manufactured by Illinois Pneumatics, Inc. of Roscoe, Ill.

Impact of the piston head against a wall or an end cap of a blow cylinder can be cushioned by use of a mechanical spring. A mechanical spring can also serve to effect retract motion of a piston head when the air pressure used to effect extension motion of the piston head is released. For example, a mechanical spring could be located in the heel space between the side of the piston head closest to the blow needle and a cavity wall. However, such a mechanical spring is itself susceptible to breakage resulting from fatigue attributable to repeated cycling. Debris resulting from breakage of the spring can damage other components of a blow cylinder. The spring imposes a set return force for a given location of the piston head with respect to the wall; there is a set return force for a given position of the blow needle. Because the return force at a given position of the piston head cannot be readily adjusted, the blow cylinder cannot be readily optimized for the manufacture of a specific container. Furthermore, over the course of its life, the spring constant of the mechanical spring may change. This can result in the return force for a given position of the blow needle changing over time, requiring adjustment of the blow cylinder, which may be difficult or impossible and requires interruption of manufacture.

In general, pneumatic cylinders in which air pressure is used to force the piston head in a direction and a mechanical spring is used to return the piston head in the opposite direction are referred to as single-acting cylinders with a spring. For example, single-acting cylinders with a spring are manufactured by Illinois Pneumatics, Inc. of Roscoe, Ill.

There thus remains an unmet need for a blow cylinder that is reliable, has long operating life, does not require adjustment over the course of its operating life, and can be readily optimized for use in manufacturing a specific container.

SUMMARY OF THE INVENTION

It is therefore an object of the present invention to provide novel blow cylinders for blow molding a container from a parison that are reliable, have long operating lives, do not require adjustment over the course of their operating lives, and can be readily optimized for use in manufacturing a specific container.

An embodiment of a blow cylinder of the present invention includes a cylinder body having a head cavity at a first body end, a rod cavity at a second body end opposite the first body end, and a rod cavity wall. The rod cavity extends from the second body end to the rod cavity wall. An end cap is attached to the cylinder body at the first body end. A blow cylinder further includes a piston assembly comprising a piston head, a piston rod, and a blow needle. The piston head is connected to the piston rod, and the piston rod is connected to the blow needle. The piston rod can have a rod bore along its axis. The blow needle can have a needle bore along its axis, where the rod bore is fluidly connected to the needle bore. The piston rod is slidable within the rod cavity, and the piston head is slidable within the head cavity. The piston head together with the head cavity defines a head space between the piston head and the end cap and a heel space between the piston head and the rod cavity wall. An extend fluid port is fluidly connected with the head space and fluidly connectable to a variable pressure fluid source for supplying an extend fluid, such as air. A retract fluid port is fluidly connected with the heel space. A minimum pressure fluid source for supplying a retract fluid, such as air, is fluidly connected to the retract fluid port and can be capable of supplying fluid at a substantially constant pressure.

A system for blow molding a container from a parison can include at least one blow cylinder, of which the retract fluid port of each blow cylinder is fluidly connected to a common minimum pressure fluid source.

The blow cylinder can include a plunger having a plunger length, a first plunger end, and a second plunger end. The piston head has a head bore fluidly connected to the head space and fluidly connected to the rod bore. The plunger is connected at the first plunger end to the end cap. The plunger is slidable within the head bore, and the plunger engages the head bore when the piston head is within a distance of the end cap less than the plunger length. The plunger can have a tapered section vicinal to the second plunger end. The end cap can include the extend fluid port.

The blow needle is capable of engaging the parison. The variable pressure fluid source can be set to a higher pressure than the minimum pressure fluid source in order to force an extend fluid into the head space and a retract fluid out of the heel space. By forcing the extend fluid into the head space, the blow needle is moved to engage the parison. The variable pressure fluid source can be set to a lower pressure than the minimum pressure fluid source in order to force the extend fluid out of the head space and the retract fluid into the heel space. By forcing the retract fluid into the heel space, the blow needle is moved to disengage the blow molded container. The variable pressure fluid source can, for example, include a valve in communication with a pressurized supply fluid source. The valve can be, for example, a single-acting spool valve. In an exemplary embodiment, the rod bore and the needle bore are capable of conveying an inflate fluid into the parison with which the blow needle is engaged.

In an embodiment, the valve is switchable to an on position in order to force an extend fluid into the head space and a retract fluid out of the heel space so that the blow needle is moved to engage the parison. The valve is switchable to an off position in order to force the extend fluid out of the head space and the retract fluid into the heel space so that the blow needle is moved to disengage the blow molded container. The movement of the blow needle to engage the parison and the movement of the blow needle to disengage the blow molded container can be controlled by a single cam or a single solenoid which switches the valve between the on position and the off position.

A method for blow molding a container from a parison includes the following steps. A blow cylinder according to the invention is provided. A minimum fluid pressure is provided in the heel space, and an extend fluid at a pressure greater than the minimum fluid pressure is forced into the head space in order to move the blow needle to an extended position to engage a parison. In another method, the minimum fluid pressure is substantially constant. In another method, the extend fluid is forced into the head space by switching on a valve fluidly connected with the head space and with a pressurized supply fluid source.

A method for blow molding a container includes inflating the parison with an inflate fluid and releasing the extend fluid from the head space by reducing the pressure of the extend fluid to less than the minimum fluid pressure in the heel space in order to move the blow needle to disengage the blow needle from the blow molded container. Another method includes releasing the extend fluid from the head space by switching off a valve fluidly connected with the head space and with the pressurized supply fluid source, the valve having a bleed feature.

An approach to blow molding a container includes the head bore becoming fluidly connected to the head space when the blow needle is in the extended position. The extend fluid passes through the head bore, the rod bore, and the needle bore and into the parison. In this approach, the inflate fluid is the same as the extend fluid.

An embodiment of a blow cylinder of the present invention includes extension means for moving the piston assembly to engage the container; an extend fluid under a variable pressure is used in conjunction with a retract fluid under a minimum pressure. The extension means can include a head means for defining a head space on the side of the piston head facing away from the blow needle. This embodiment includes a retraction means for moving the piston assembly to disengage the container; an extend fluid under a variable pressure is used in conjunction with a retract fluid under a minimum pressure. The retraction means can include a heel means for defining a heel space on the side of the piston head facing towards the blow needle. In an exemplary embodiment, a blow cylinder of the present invention includes inflation means for inflating the container when the piston assembly engages the container.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without parting from the spirit and scope of the invention. All references cited herein are incorporated by reference as if each had been individually incorporated.

In an embodiment of a blow cylinder of the present invention, a fluid at a minimum pressure in the heel space between the piston head and the cylinder body in a blow cylinder prevents the piston head from violently impacting a rod cavity wall, which limits travel of the piston head, when the piston is forced to drive a blow needle to engage a parison during blow molding. The fluid at a minimum pressure in the heel space cushions or eliminates such impact of the piston head. This embodiment of a blow cylinder of the present invention thereby overcomes a limitation of prior art blow cylinders in which the piston head is driven by pressure so that it violently impacts a rod cavity wall.

The fluid at a minimum pressure in the heel space also effects return of the blow needle following inflation of the parison for blow molding the container. Only one valve with an on position and an off position is required to support operation of the blow cylinder. Mechanical springs need not be included in a blow cylinder of the present invention. A blow cylinder of the present invention therefore can have longer operating life, more consistent functioning over its life, and greater adaptability to a process for manufacturing a container than a conventional blow cylinder. The structure and operation of embodiments of blow cylinders of the present invention are described below with the aid of figures.

Figure 1:
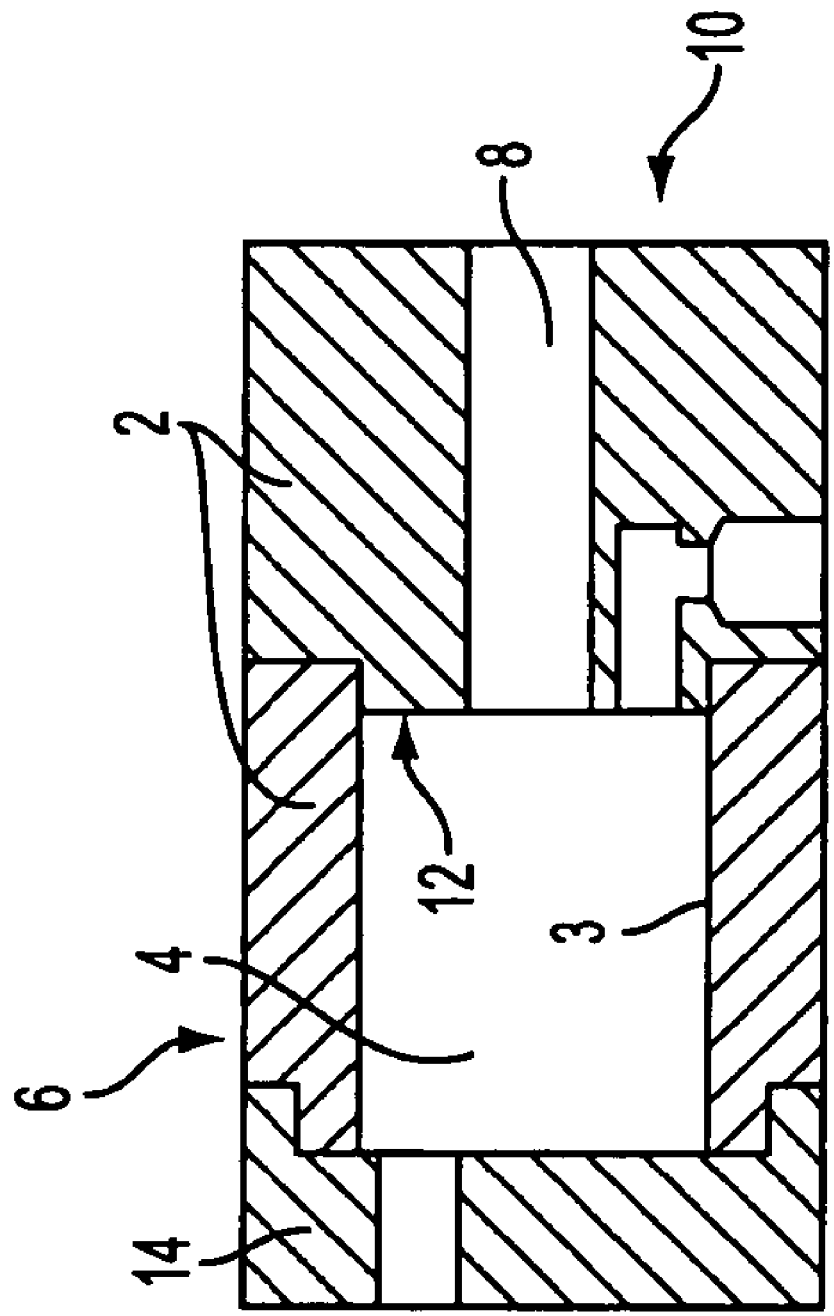
FIG. 1 is a sectional view of a blow cylinder without the piston assembly according to an embodiment of the invention.

An embodiment of a cylinder body 2 for housing a piston assembly is depicted in FIG. 1. The cylinder body 2 has a first body end 6 and a second body end 10. A head cavity 4 is contiguous with a rod cavity 8. The head cavity 4 and rod cavity 8 are generally cylindrical in shape, but can have a different shape complementary to the shape of the piston head and rod, which are described below. An end cap 14 is attached to the cylinder body 2 at the first end 6. The end cap 14 can be attached to the cylinder body 2 in various ways. For example, the end cap 14 can be attached to the cylinder body 2 by screws or by threading the end cap 14, threading the cylinder body 2, and screwing the end cap 14 onto the cylinder body 2. The head cavity 4 is bounded by the end cap 14 and the rod cavity 8 is open to the environment at the second body end 10. The side wall 3, together with the end cap 14 and the rod cavity wall 12, defines the head cavity 4. The rod cavity wall 12 forms the end of the head cavity 4 opposite the end cap 14. The rod cavity wall 12 can be perpendicular to the side wall 3 of the head cavity 4 and to the wall of the rod cavity 8 at the location where the head cavity 4 and the rod cavity 8 meet. In the embodiment depicted in FIG. 1, the cylinder body 2 is formed from two components. In alternative embodiments, the cylinder body 2 can be formed from only one component or formed from more than two components.

Figure 2:
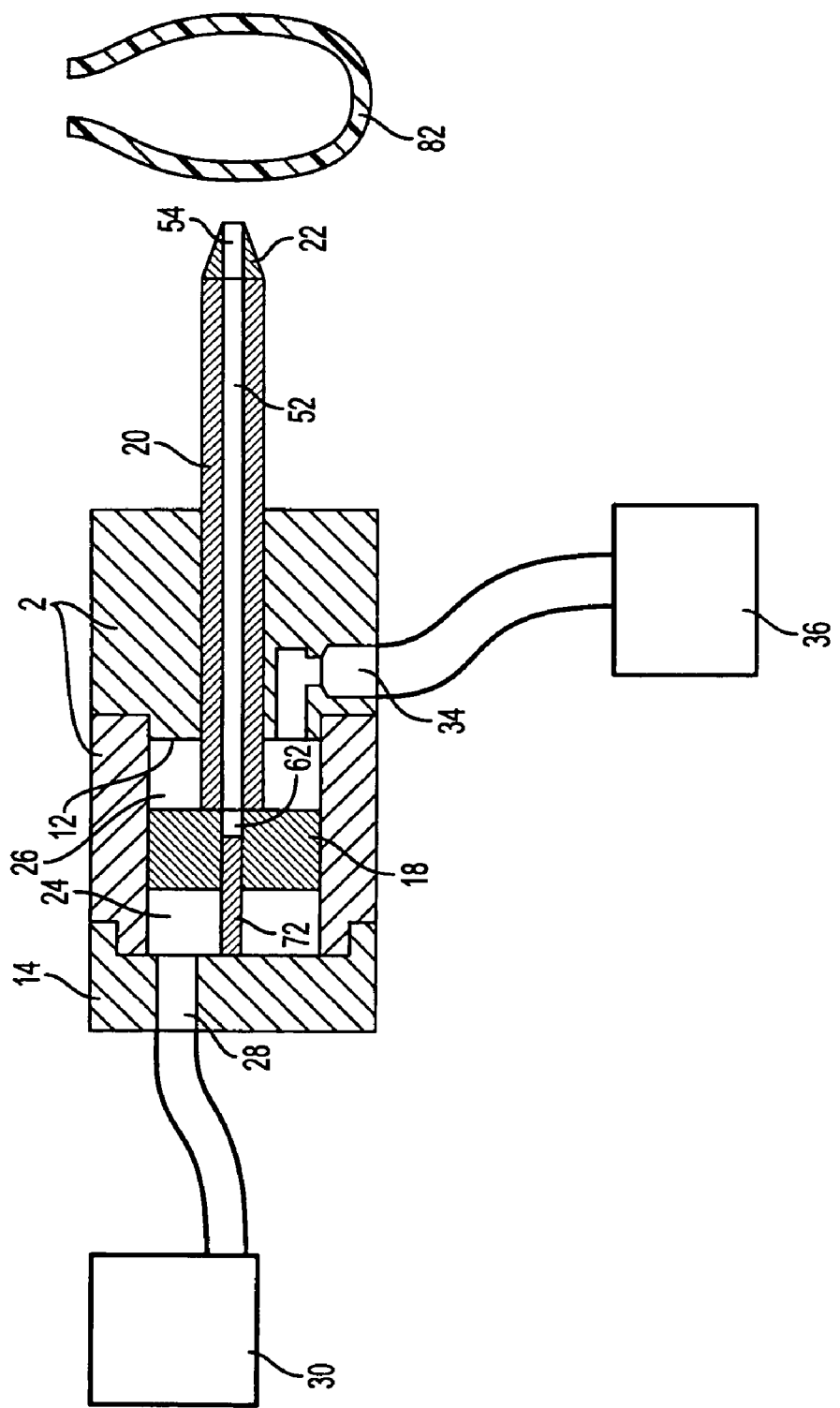
FIG. 2 is a sectional view of a blow cylinder including the piston assembly according to an embodiment of the invention.

FIG. 2 illustrates the embodiment of the cylinder body 2 shown in FIG. 1 and also includes the piston assembly. The piston assembly includes a piston head 18, a piston rod 20, and a blow needle 22. The piston head 18 is positioned within the head cavity 4 and the piston rod 20 is positioned within the rod cavity 8. The piston head 18 is connected to the piston rod 20. The piston head 18 is slidable within the head cavity 4 and the piston rod 20 is slidable within the rod cavity 8. The blow needle 22 is connected to the piston rod 20. The diameter of the blow needle 22 tapers from the point of connection with the piston rod 20 to the end of the blow needle 22, which pierces the parison 82 during extension of the piston assembly, i.e., during movement of the piston assembly towards the parison 82 to engage the parison 82. The blow needle 22 can be a separate component connected to the piston rod 20. Alternatively, the blow needle 22 can be the terminus of the piston rod 20.

The piston head 18, in conjunction with the cylinder body 2 and the end cap 14, acts to separate the head cavity 4 into two compartments: a head space 24 located between the piston head 18 and the end cap 14 and a heel space 26 located between the piston head 18 and the rod cavity wall 12. An extend fluid can pass into the head space 24 through an extend fluid port 28. Similarly, a retract fluid can pass into the heel space 26 through a retract fluid port 34.

A minimum pressure fluid source 36 can be connected to the retract fluid port 34 and can impose a minimum pressure, which can be constant, on the retract fluid in the heel space 26. A variable pressure fluid source 30 can be connected to the extend fluid port 28. It is understood that when the variable pressure fluid source 30 is set to impose a greater pressure on the extend fluid in the head space 24 than the minimum pressure fluid source 36 imposes on the retract fluid in the heel space 26, extend fluid is forced into the head space 24 and retract fluid is compressed within and forced out of the heel space 26. By forcing extend fluid into the head space 24, the piston assembly, including the piston head 18, the piston rod 20, and the blow needle 22, is forced towards the parison 82 so that the blow needle 22 engages the parison 82. In an embodiment, the extend fluid is a gas and the pressure imposed on the extend fluid to effect movement of the piston assembly towards the parison is in the range of 70 to 100 psi. When the variable pressure fluid source 30 is set to impose a lesser pressure on the extend fluid in the head space 24 than the minimum pressure fluid source 36 imposes on the retract fluid in the heel space 26, extend fluid is released from, i.e., forced out of, the head space 24 and retract fluid is forced into the heel space 26. By forcing retract fluid into the heel space 26, the piston assembly, including the blow needle 22, is forced away from the container blow molded from the parison 82 so that the blow needle 22 disengages the container. In an exemplary embodiment, the minimum pressure fluid source 36 is capable of supplying retract fluid at a substantially constant pressure. In another embodiment, the retract fluid is a gas and the pressure imposed on the retract fluid is in the range of 25 to 30 psi.

The retract fluid used can be the same as or different from the extend fluid used. For example, in the embodiment shown in FIG. 2, the retract fluid and the extend fluid are isolated from each other and can be different. Each of the extend fluid and the retract fluid can either be a liquid or a gas. For example, a fluid can be a gas such as air or a liquid such as oil or water. The ability to use a range of different gas or liquid fluids is advantageous because it allows the operation of the blow cylinder to be optimized for the manufacture of a specific container.

In the embodiment shown in FIG. 2, the extend fluid port 28 is located within the end cap 14, and the retract fluid port 34 is located within the cylinder body 2 and opens to the heel space 26 through the rod cavity wall 12. In an alternative embodiment, the extend fluid port 28 could instead be located within the cylinder body 2 and be open to the heel space 26 through the side wall 3, or at some other location, as long as the extend fluid port 28 is open to the head space 24 for all positions of the piston head 18. Similarly, the retract fluid port 34 could be located within the cylinder body 2 and be open to the heel space 26 through the side wall 3 or at some other location, as long as the retract fluid port 34 is open to the heel space 26 for all positions of the piston head 18.

In the embodiment shown in FIG. 2, the piston rod 20 has a rod bore 52, which runs along the axis of the piston rod 20. Similarly, the blow needle 22 has a needle bore 54, which runs along the axis of the blow needle 22. The rod bore 52 and the needle bore 54 are fluidly connected such that inflate fluid being conveyed by, i.e., flowing through, the rod bore 52, can flow through the needle bore 54 and into the parison 82 to inflate the parison 82 to blow mold the container.

In the embodiment shown in FIG. 2, a head bore 62 is located within the piston head 18. The head bore 62 is fluidly connected to the rod bore 52 such that an inflate fluid can pass from the head bore 62 into the rod bore 52. A plunger 72 can be connected at a first end to the end cap 14. The diameter of the plunger 72 and the diameter of the head bore 62 are selected such that the plunger 72 can enter into the head bore 62. Furthermore, the axis of the plunger 72 and the axis of the section of the head bore 62 that can open to the head space 24 are aligned. When the piston assembly is in a retracted position, the plunger 72 is engaged with the head bore 62 to seal off the head bore 62, and thereby seal off the rod bore 52 and the needle bore 54 from the head space 24.

It is understood that when the plunger 72 is engaged with the head bore 62, and the pressure of the extend fluid in the head space 24 is increased above the pressure of the retract fluid in the heel space 26, the piston assembly is driven towards the parison 82. Once the piston assembly travels far enough towards the parison 82, for example, when the distance of the piston head 18 from the end cap 14 is greater than the length of the plunger 72, the plunger 72 leaves the head bore 62. Extend fluid can then pass from the head space 24 into the head bore 62 such that the extend fluid is forced through the head bore 62, the rod bore 52, and the needle bore 54 and into the parison 82. Thus, according to this embodiment, the extend fluid is the inflate fluid.

It is understood that when the piston head 18 is forced towards the parison 82 by the extend fluid flowing into the head space 24, retract fluid must be forced out of the heel space 26. However, the diameters of the apertures in the retract fluid port 34 are small so that there is resistance to the retract fluid flowing out of the heel space 26 and back to the minimum pressure fluid source 36. This resistance to flow has the effect of momentarily inducing an increase in the pressure of the retract fluid in the heel space 26 above the pressure imposed by the minimum pressure fluid source 36. When the retract fluid is a liquid, this momentary increase in pressure can slow the motion of the piston head 18 towards the rod cavity wall 12 so that the piston head 18 does not violently impact the rod cavity wall 12. When the retract fluid is a gas, the resistance to flow of the retract fluid out of the heel space 26 will result in compression of the gaseous retract fluid, associated with the momentary increase in pressure of the gaseous retract fluid. The gaseous retract fluid can act as a pneumatic spring, slowing the motion of the piston head 18 a short distance before the rod cavity wall 12. The gaseous retract fluid can thereby allow for a high average rate of speed of the piston head 18 towards the parison 82, while also slowing the piston head 18 a short distance before the rod cavity wall 12 so that the piston head 18 does not violently impact the rod cavity wall 12. Hence, an embodiment of a blow cylinder of the present invention, shown in FIG. 2, overcomes a limitation of blow cylinders in the prior art that simply force a piston head 18 against a rod cavity wall 12 by pressure so that the piston head 18 violently impacts the rod cavity wall 12.

After the parison 82 has been inflated to blow mold the container, the pressure of the variable pressure fluid source 30 can be lowered such that the pressure of the extend fluid in the head space 24 is less than the pressure of the retract fluid in the heel space 26. The piston assembly is thereby driven away from the blow molded container such that the plunger 72 again engages the head bore 62. The head bore 62, rod bore 52, and needle bore 54 are then isolated from the head space 24 so that the extend fluid can no longer travel through the head bore 62, rod bore 52, and needle bore 54 into the blow molded container. The piston assembly then continues to move away from the blow molded container such that the blow needle 22 disengages from the blow molded container. This represents completion of an operation cycle of the embodiment of the blow cylinder illustrated in FIG. 2.

Because the piston assembly can be forced away from the container by the retract fluid, e.g., air, no mechanical spring is required. Blow cylinders of the present invention have long life and exhibit consistent operation over their life, and thus overcome limitations of conventional blow cylinders that use only a mechanical spring, in which the spring is susceptible to breakage and the spring constant may vary over the life of the spring. The pressure supplied by the minimum pressure fluid source 36 can be set within a range. The ability to adjust the minimum pressure fluid source 36 allows for optimization of the functioning of the blow cylinder for a specific application, e.g., for the molding of a specific container. For example, an application could require a large force to act on the piston head 18 and thereby on the blow needle 22 when the blow needle 22 pierces the parison 82. To achieve this, the minimum pressure fluid source 36 could be set to a low pressure. Another application could require that fluid be injected into a parison 82 at high pressure. The variable pressure fluid source 30, which supplies the extend fluid, which is the same as the inflate fluid in the embodiment shown in FIG. 2, could then be set to a high pressure when the blow needle 22 is to be moved towards the parison 82. The minimum pressure fluid source 36 could then also be maintained at a high pressure, so that adequate cushioning of the impact of the piston head 18 against the rod cavity wall 12 is provided. Blow cylinders according to the present invention can thereby overcome a limitation of single-acting cylinders with a spring in which the force imposed by the spring for a given location of the piston head cannot be adjusted.

The plunger 72 can have a taper over a section vicinal to the second end of the plunger, opposite to the first end, which engages the head bore 62. The taper can serve the function of facilitating alignment of the plunger 72 with the head bore 62 when the piston head 18 moves away from the parison 82 and the plunger 72 engages the head bore 62.

In the embodiment shown in FIG. 2, the inflate fluid, which passes through the head bore 62, rod bore 52, and needle bore 54 and into the parison 82, is identical to the extend fluid, which passes into the head space 24. In alternative embodiments the inflate fluid can be different from the extend fluid. For example, the head bore 62 can be designed to open out of the side of the piston head 18 so that it would match a port within the cylinder body 2, which was open to the head cavity 4 through the side wall 3, at a point along the travel of the piston head 18. Upon alignment of the head bore 62 and such a port through the side wall 3, an inflate fluid can be forced through the port and into the head bore 62 and then through the rod bore 52 and needle bore 54 and into a parison 82.

The variable pressure fluid source 30 can be fluidly connected to the extend fluid port 28 of the blow cylinder. In an embodiment, the variable pressure fluid source 30 includes a valve of which an inlet is fluidly connected to a pressurized supply fluid source. An outlet of the valve can be fluidly connected to the extend fluid port 28 of the blow cylinder. In an embodiment, the valve has two positions, on and off. When the valve is in the off position, the pressurized supply fluid source is isolated from the extend fluid port 28; when the valve is in the on position, the pressurized supply fluid source is fluidly connected to the extend fluid port 28. The valve can have a bleed feature such that when the valve is in the off position, extend fluid at the extend fluid port 28 can pass back to and out of the valve to the environment. A bleed feature represents a way through which excess extend fluid can be eliminated so that the piston assembly can be forced away from the blow molded container when the pressure imposed by the variable pressure fluid source 30 is reduced below the pressure of the minimum pressure fluid source 36. The valve can be, for example, a single-acting spool valve.

It is understood that the small diameters of apertures in extend fluid port 28 can provide resistance to the flow of extend fluid out of the head space 24. If the variable pressure source 30 includes a bleed valve as described above, the small diameters of apertures in the bleed valve also provide resistance to the flow of extend fluid to the environment. The resistance to flow has the effect of momentarily inducing an increase in the pressure of the retract fluid in the head space 24 above the pressure imposed by the variable pressure fluid source 30. When the extend fluid is a liquid, this momentary increase in pressure can slow the motion of the piston head 18 towards the end cap 14 so that the piston head 18 does not violent impact the end cap 14. When the extend fluid is a gas, e.g., air, the resistance to flow of the extend fluid out of the head space 24 can result in compression of the gaseous extend fluid, associated with the momentary increase in pressure of the gaseous extend fluid. The gaseous extend fluid can act as a pneumatic spring, slowing the motion of the piston head 18 a short distance before the end cap 14. The gaseous extend fluid can thereby allow for a high average rate of speed of the piston head 18 away from the blow molded container, while also slowing the piston head 18 a short distance before the end cap 14 so that the piston head 18 does not violently impact the end cap 14. Hence, the embodiment of a blow cylinder of the present invention, shown in FIG. 2, overcomes a limitation of blow cylinders in the prior art that simply force a piston head 18 against an end cap 14 by pressure so that the piston head 18 violently impacts the end cap 14.

In an embodiment, only one on-off valve is required to control the operation of a blow cylinder of the invention. Only a single cam or a single solenoid with a single set of an activation and a deactivation switch is needed to control the single on-off valve. This overcomes a limitation of blow cylinders in the prior art that require two on-off valves, one for controlling the flow of fluid to the head space 24 and the other for controlling the flow of fluid to the heel space 26. Such a conventional design requires two cams or two solenoids, each with an activation and a deactivation switch, to control the two valves. The use of a three-way valve of which the input is connected to a fluid source, one output is connected to the head space 24, and the other output is connected to the heel space 26 is unsuitable for certain applications of the blow cylinder. It can be important that pressure in the head space 24 is relieved before pressure is applied to the heel space 26; otherwise, movement of the piston head 18 away from the molded container could be impeded. Thus, in certain applications, movement of the piston head 18 cannot be adequately controlled by a single cam or solenoid actuating a three-way valve. Furthermore, even if a single three-way valve can be used instead of two on-off valves in a conventional blow cylinder design, a three-way valve is more expensive than an on-off valve. Therefore, equipment to control operation of a blow cylinder according to the present invention is more simple and less expensive than equipment to control operation of blow cylinders of the prior art.

In a blow molding system incorporating multiple blow cylinders of the invention the retract fluid ports 34 of each of the blow cylinders can all be connected to a single minimum pressure fluid source 36. The minimum pressure fluid source 36 can include a single pressure-regulating valve of which one side is connected to a constant pressure source and the other side is connected to the set of retract fluid ports 34 of the blow cylinders. Thus, only one pressure regulator is required to simultaneously set the retract fluid pressure in the heel space 26 of all the blow cylinders.

In an alternative embodiment of the present invention, a valve connected at an inlet to a pressurized supply fluid source and at an outlet to the extend fluid port 28 is a self-relieving pressure regulator. The pressure imposed at the extend fluid port 28 can be varied from a low value when in an off position to a higher value when in an on position, which can be up to the pressure of the pressurized supply fluid source. The pressure regulator can initially be adjusted to increase the pressure imposed at the extend fluid port 28, to force extend fluid into the head space 24 and retract fluid out of the heel space 26 so that the piston assembly is moved towards the parison 82, and the blow needle 22 engages the parison 82. After the parison 82 has been inflated to blow mold the container, the pressure regulator can be adjusted to decrease the pressure imposed at the extend fluid port 28, to force extend fluid out of the head space 24 and retract fluid into the heel space 26 so that the piston assembly is moved away from the container blow molded from the parison 82, and the blow needle 22 disengages the container.

Certain details of the embodiments of the invention depicted in FIGS. 1 and 2 are not shown. For example, O-rings could be used to ensure isolation of the head space 24 from the heel space 26 where the piston head 18 is in slidable contact with the side wall 3. O-rings could also be used to isolate the heel space 26 from the environment where the piston rod 20 is in slidable contact with the wall of the cylinder body 2 defining the rod cavity 8. O-rings could be used to isolate the head bore 62 from the head space 24 when the plunger 72 is in slidable contact with the wall of the piston head 18 defining the head bore 62. Fittings used to connect the variable pressure fluid source 30 with the extend fluid port 28 and used to connect the minimum pressure fluid source 36 with the retract fluid port 34 are not shown. All of these features and fittings are standard assembly parts well known to persons skilled in the art.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A blow cylinder for blow molding a container from a parison, comprising:
   a cylinder body having a head cavity at a first body end, a rod cavity at a second body end opposite said first body end, and a rod cavity wall;
   said rod cavity extending from said second body end to said rod cavity wall;
   an end cap attached to said cylinder body at said first body end;
   a piston assembly comprising a piston head, a piston rod, and a blow needle;
   said piston head connected to said piston rod;
   said piston rod connected to said blow needle;
   said piston rod slidable within said rod cavity;
   said piston head slidable within said head cavity;
   said piston head cooperating with said head cavity to define a head space between said piston head and said end cap and a heel space between said piston head and said rod cavity wall;
   an extend fluid port fluidly connected with said head space and fluidly connectable to a variable pressure fluid source for supplying an extend fluid;
   a retract fluid port fluidly connected with said heel space; and,
   a minimum pressure fluid source for supplying a retract fluid, fluidly connected to said retract fluid port.

2. A system for blow molding a container from a parison, comprising:
   more than one blow cylinder according to claim 1; wherein, said retract fluid port of each said blow cylinder fluidly connected to a common minimum pressure fluid source.

3. The blow cylinder of claim 1,
said minimum pressure fluid source capable of supplying retract fluid at a substantially constant pressure.

4. The blow cylinder of claim 1,
the extend fluid and the retract fluid comprising air.

5. The blow cylinder of claim 1:
said piston rod having a rod bore along an axis of said piston rod;
said blow needle having a needle bore along an axis of said blow needle; and,
said rod bore being fluidly connected to said needle bore.

6. The blow cylinder of claim 5, further comprising
a plunger having a plunger length, a first plunger end, and a second plunger end, and
said piston head having a head bore fluidly connected to said rod bore and fluidly connectable to said head space,
said plunger connected at said first plunger end to said end cap,
said plunger slidable within said head bore, and
said plunger engaging said head bore when said piston head is within a distance of said end cap less than said plunger length.

7. The blow cylinder of claim 1,
said end cap comprising said extend fluid port.

8. The blow cylinder of claim 1:
said blow needle capable of engaging the parison;
said variable pressure fluid source capable of being set to a greater pressure than said minimum pressure fluid source for forcing an extend fluid into said head space and a retract fluid out of said heel space for moving said blow needle to engage the parison;
said variable pressure fluid source capable of being set to a lesser pressure than said minimum pressure fluid source for forcing the extend fluid out of said head space and the retract fluid into said heel space for moving said blow needle to disengage the blow molded container.

9. The blow cylinder of claim 8:
said piston rod having a rod bore along an axis of said piston rod;
said blow needle having a needle bore along an axis of said blow needle;
said rod bore being fluidly connected to said needle bore; and,
said rod bore and said needle bore capable of conveying an inflate fluid into the parison with which said blow needle is engaged.

10. The blow cylinder of claim 1,
said variable pressure fluid source comprising a valve in communication with a pressurized supply fluid source.

11. The blow cylinder of claim 10,
said valve comprising a single-acting spool valve.

12. The blow cylinder of claim 10:
said blow needle capable of engaging the parison;
said valve switchable to an on position for forcing an extend fluid into said head space and a retract fluid out of said heel space for moving said blow needle to engage the parison; and,
said valve switchable to an off position for forcing the extend fluid out of said head space and the retract fluid into said heel space for moving said blow needle to disengage the blow molded container.

13. The blow cylinder of claim 12:
the movement of said blow needle to engage the parison and the movement of said blow needle to disengage the blow molded container capable of being controlled by a single cam or solenoid which switches said valve between the on position and the off position.

14. A system for blow molding a container from a parison, comprising
more than one blow cylinder according to claim 13, wherein
said retract fluid port of each said blow cylinder fluidly connected to a common minimum pressure fluid source.

15. A method for blow molding a container from a parison, comprising the steps of:
providing a blow cylinder comprising
a cylinder body having a head cavity at a first body end and a rod cavity wall,
an end cap attached to said cylinder body at said first body end,
a piston assembly comprising a piston head, a piston rod, and a blow needle,
said piston head connected to said piston rod,
said piston rod connected to said blow needle,
said piston head slidable within said head cavity,
said blow needle having an extended position, and
said piston head cooperating with said head cavity to define a head space between said piston head and said end cap and a heel space between said piston head and said rod cavity wall;
providing a minimum fluid pressure in said heel space; and,
forcing an extend fluid at a pressure greater than said minimum fluid pressure into said head space for moving said blow needle to said extended position to engage a parison.

16. The method for blow molding a container of claim 15, said minimum fluid pressure being substantially constant.

17. The method for blow molding a container of claim 15, said forcing the extend fluid into said head space comprising switching on a valve fluidly connected with said head space and with a pressurized supply fluid source.

18. The method for blow molding a container of claim 15, the extend fluid comprising air.

19. The method for blow molding a container of claim 15, further comprising the steps of:
inflating the parison with an inflate fluid;
releasing the extend fluid from said head space by reducing the pressure on said extend fluid to less than said minimum fluid pressure for moving said blow needle to disengage said blow needle from the blow molded container.

20. The method for blow molding a container of claim 19,
said step of releasing the extend fluid from said head space comprising switching off a valve fluidly connected with said head space and with a pressurized supply fluid source, said valve having a bleed feature.

21. The method for blow molding a container of claim 19,
said piston rod having a rod bore along an axis of said piston rod,
said blow needle having a needle bore along an axis of said blow needle,
said rod bore being fluidly connected to said needle bore, and
said step of inflating the parison with an inflate fluid comprising conveying the inflate fluid through said rod bore and said needle bore and into the parison.

22. The method for blow molding a container of claim 21, the inflate fluid comprising air.

23. The method for blow molding a container of claim 21, said piston head having a head bore fluidly connected to said rod bore, said head bore becoming fluidly connected to said head space when said blow needle is in said extended position such that the extend fluid passes through said head bore, said rod bore, and said needle bore and into the parison, the extend fluid being the inflate fluid.

24. A blow cylinder for blow molding a container from a parison, comprising:

extension means for moving a piston assembly to engage the parison by using an extend fluid under a variable pressure in conjunction with a retract fluid under a minimum pressure; and, retraction means for moving said piston assembly to disengage the container blow molded from the parison by using the extend fluid under the variable pressure in conjunction with the retract fluid under the minimum pressure.

25. The blow cylinder of claim 24, the retract fluid being under a substantially constant pressure.

26. The blow cylinder of claim 24, the extend fluid and the retract fluid comprising air.

27. The blow cylinder of claim 24:

said piston assembly comprising a piston head, a piston rod, and a blow needle;

said piston head connected to said piston rod;

said piston rod connected to said blow needle;

said piston head having a side facing away from said blow needle;

said extension means comprising a head means for defining a head space on said side of said piston head facing away from said blow needle.

28. The blow cylinder of claim 24:

said piston assembly comprising a piston head, a piston rod, and a blow needle;

said piston head connected to said piston rod;

said piston rod connected to said blow needle;

said piston head having a side facing towards said blow needle;

said retraction means comprising a heel means for defining a heel space on said side of said piston head facing towards said blow needle.

29. The blow cylinder of claim 24, further comprising inflation means for inflating the parison when said piston assembly engages the parison.

30. The blow cylinder of claim 29:

said piston assembly comprising a piston head, a piston rod, and a blow needle;

said piston rod having a rod bore along an axis of said piston rod;

said blow needle having a needle bore along an axis of said blow needle;

said rod bore being fluidly connected to said needle bore;

said inflation means comprising a means for forcing an inflate fluid through said rod bore and through said needle bore and into the parison when said blow needle is engaged with the parison.

* * * * *